Dec. 24, 1968     J. M. VAN LANEN ET AL     3,418,211
PROCESS OF PRODUCING GLUCAMYLASE AND AN ALCOHOL PRODUCT
Filed Dec. 13, 1965
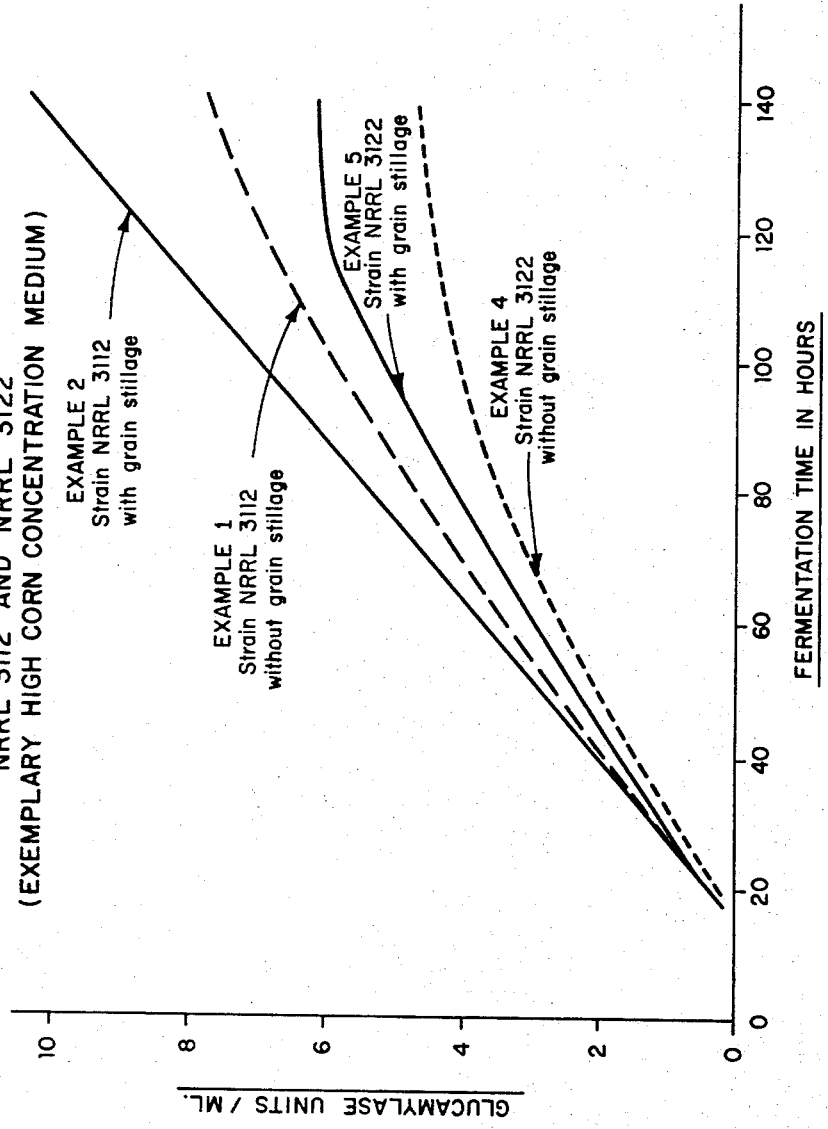
INVENTORS:
JAMES M. VAN LANEN
MERRITT B. SMITH United States Patent Office 3,418,211
Patented Dec. 24, 1968

3,418,211
PROCESS OF PRODUCING GLUCAMYLASE AND AN ALCOHOL PRODUCT
James M. Van Lanen and Merritt B. Smith, Peoria, Ill., assignors to Hiram Walker & Sons, Inc., Peoria, Ill., a corporation of Michigan
Filed Dec. 13, 1965, Ser. No. 513,227
14 Claims. (Cl. 195—31)

ABSTRACT OF THE DISCLOSURE

A process of producing a high potency glycamylase enzyme system by cultivation under submerged aerobic conditions of an exceptionally active strain of *Aspergillus niger* in a cereal grain medium of high concentration, to which a nutrient supplement consisting of grain stillage or distillers dried solubles is added; and a process of saccharifying and fermenting a starch product to alcohol by adding thereto a ferment including an enzyme system produced by cultivation of such strain in a suitable growth medium.

---

This invention relates to the production of a fungal enzyme system and to the use of this system for the saccharification and fermentation of cereal grains, starch, and starch products to grain spirits. More particularly, the invention is concerned with the use of selected or mutant strains of Aspergillus species and novel substrates and growth conditions which result in ferments of exceptionally high enzyme activity and with the methods by which these ferments can be advantageously used in the production of grain spirits.

Prior art (U.S. patents Nos. 2,451,567, 2,881,115, 2,893,921, and 3,012,944) reveals that a number of species and strains of the *Aspergillus niger* group are capable of producing starch-hydrolyzing enzymes under submerged, aerobic growth conditions. For the most part, the enzyme of interest in this art is that which converts starch, dextrins, and maltose substrates to dextrose and which has been variously named glucamylase, amyloglucosidase, glucoamylase, glucogenic activity, and maltase. The activity of this enzyme may be measured by the rate of conversion of one of the indicated substrates to dextrose. Enzyme activity may also be measured by the rate of yeast fermentation and the consequent yield of alcohol from these substrates. The term "glucamylase" will be used hereinafter to describe the starch-hydrolyzing enzyme produced in our process and "glucamylase ferment" to describe the whole final ferment containing enzymes which attack starch and proteins.

In the prior art, a selected or derived culture of Aspergillus has been combined with particular substrate and growth conditions to yield ferments of high glucamylase enzyme activity. In accordance with the present invention, two particular very active Aspergillus cultures are combined with substrates which are preferably of the nature hereinafter described for the production of glucamylase and other enzymes essential to near-maximum rates of yeast fermentation and to near-complete conversion of starch to fermentable sugars. One of the other types of enzyme which we have discovered is produced in substantial amounts in our process and which is especially important in grain yeast fermentations is proteinase. This enzyme makes available yeast nutrients from grains which promote yeast growth and fermentative activity. As a result, the glucamylase ferment that results from the practice of the present invention possesses exceptional activity as a fermentation supplement even in instances where conventional malt fermentation is conducted.

The novel features for grain alcohol fermentation of the enzyme system produced by our invention are: (1) The enzyme potency of glucamylase ferments is about two to three times that previously obtainable. (2) The rates of starch and dextrin saccharification are greatly increased. (3) The yields of alcohol are increased primarily because saccharification is more complete. (4) Yeast growth is enhanced permitting the use of much smaller than conventional amounts of yeast inoculum. (5) More concentrated grain or grain product mashes can be fermented than is possible with conventional saccharifying agents, such as barley malt. (6) The organoleptic quality of the alcohol produced is excellent and comparable to that obtained by conventional saccharification and fermentation methods. (7) Feed byproducts are more enriched in protein, fat, minerals, and vitamins because the carbohydrate fraction of the mash is more completely fermented. Accordingly, it is a primary object of this invention to provide a new and unique glucamylase system by the combination of selected Aspergillus strains and novel substrates.

It is an equally important object of this invention to utilize the new and unique glucamylase system in the production of alcoholic beverages.

These and other objects, advantages, and features of the subject invention will appear from the following detailed description thereof (including several examples that serve to illustrate the practice of the subject invention and its several advantages in the production of grain spirits) in conjunction with the appended drawing (in which graphical representations of certain of the examples are set forth). However, it should be understood that the invention could also be used for the production of whiskey distillates and would exhibit the same advantages as referred to herein for grain spirits. For whiskey production, various amounts of malt could be used with glucamylase ferment in accordance with the amount and type of distillate character desired, in which event the glucamylase ferment of the subject invention may best be characterized as a fermentation supplement.

In general, an enzyme system for saccharifying and fermenting grain mashes can be produced in accordance with the subject invention in the following manner: In the preferred approach, a medium is prepared from ground cereal grain, other beneficial nutrient supplements identified below, and water, and the pH of the medium is adjusted to a pH of 4.0 to 7.0. The medium is then sterilized and cooled to between 80 and 95° F. Finally, the sterilized medium is inoculated with a growing culture of one of the highly active strains identified below under submerged, aerobic conditions (i.e., preferably vigorously aerating and agitating the medium for a period of 3–7 days at 85°–95° F.). To obtain the high enzyme potencies that characterize the present invention, the grain concentration should be relatively high as compared to prior art practices and should preferably range between 12 and 20 g. grain per 100 ml. of medium. The nutrient supplements that have been discovered to greatly increase the rate of glucamylase production comprise grain stillage (the dealcoholized, liquid-grain residue from a previous grain alcohol fermentation) and distillers dried solubles (the product obtained by removing alcohol and grain screenings from grain stillage to produce thin grain stillage and then evaporating and drying the fraction). These supplements are used on a dry substance basis at the rate of from 1 to 10 percent based on the total weight of the final medium, with the preferred level being 3 to 6 percent of the total weight of the final medium. While these supplements are advantageously utilized as a component of a novel substrate for the particular strains identified below, it should be understood that such strains are in themselves useful in achieving the objectives of the present invention.

To achieve high yields of glycamylase, aeration and agitation must be of such an intensity as to provide an excess (i.e., 3 p.p.m. or more) of dissolved oxygen in the ferment throughout the fermentation cycle. This is accomplished by an aeration rate between 0.25 and volume of air per volume of medium per minutes and by agitation corresponding to that provided by a power input of from 0.5 to 2.5 hoursepower per 100 gallons of medium. Pure culture conditions should be employed at all stages of inoculum development and fermentation, and the air used should be sterilized by any of the means well known in the art of aerobic fermentation.

Glucamylase activity in ferments may be determined by determining the amount of dextrose formed from solubilized starch under specified conditions of time and temperature. For example, a method as described in Miles Chemical Co. Tech. Bull., No. 2–122, p. 21, 1962, can be utilized. In this method, a glucamylase (amyloglucosidase) unit is the amount of enzyme necessary to form 1 g. dextrose from 4 g. starch substrate in 1 hour at 60° C.

To determine activity in the saccharification and fermentation of grain mashes the following procedure may be used. Grain meal with about 0.5% by weight of barley malt (premalt) is slurried in water and cooked at 200–250° F. to gelatinize the starch. The mash is cooled to about 150° F. and saccharified with glucamylase ferment at the rate of about 500 ml. per bushel of grain or with the same amount of glucamylase ferment and malt at the rate of 0.5 to 2% by weight of grain. Other microbial amylases may be used in place of malt to liquefy the starch. The mash is then cooled to 80–90° F., inoculated with an active culture of yeast, and allowed to ferment. The activity of different glucamylase ferments may then be determined by weighing the flasks at intervals (weight losses due to carbon dioxide evolution being measures of fermentation rates) and by determining alcohol at intervals of incubation and after fermentation is essentially completed.

Two strains of *Aspergillus niger* have been found to be most suitable for the indicated saccharification and fermentation, viz., *Aspergillus niger* NRRL 3112 and *Aspergillus niger* NRRL 3122. These two cultures are mutants that were obtained by irradiation. When grown in the media and under the conditions described herein, ferments of these cultures are more active and efficacious than any previously unilized in the production of grain alcohol, as is more fully indicated by the following Examples 1–6.

EXAMPLE 1

This experiment deals with the glucampyase yield of a high grain medium—*A. niger* 3112 combination. A stainless steel fermentor equipped with an air sparger and an agitator (430 r.p.m. and 8″ diameter) powered by a ¾ horsepower motor was used. The total capacity of the fermentor was 75 gal., and the normal medium volume was about 50 gal. A glucamylase medium consisting of 100 lb. of ground corn, 0.5 lb. ground barley malt, and 40 gal. of tap water was used. This medium was raised to 250° F. by introducing steam into the fermentor. After holding at 250° F. for 5 minutes, the medium was cooled to 150° F. by cooling the outer surface of the fermentor. One lb. of ground barley malt was added, and the temperature was held at 150° F. for 10 minutes to allow for partial liquefaction of the corn starch. The temperature was again raised to 250° F., and the medium was held at this temperature for 60 minutes, cooled to 94° F. as previously described, and then was inoculated with 6 liters of a growing culture of *A. niger* 3112.

The indicated inoculum was prepared as follows: Spores from a stock spore culture grown on Czapek solution agar were transferred to two 500 ml. Erlenmeyer flasks containing 100 ml. of medium consisting of 4.5 g. ground corn, 0.5 g. ground barley malt, .25 g. of yeast extract, and 95 ml. of tap water. This medium was adjusted to pH 5.0 with sulfuric acid before sterilization and was then sterilized. After 24 hours' incubation of the flask cultures on a mechanical shaker at 84° F., each 100 ml. culture was transferred aseptically to 3 l. of medium in two 6 l. Florence flasks equipped with an air filter and air sparger. The medium contained per flask 135 g. of ground corn, 15 g. ground barley malt, 7.5 g. yeast extract, and 2850 ml. tap water. The pH was adjusted to 5.0 with sulfuric acid before sterilization and was then sterilized. The flask cultures were incubated for 24 hours at 84° F. during which time sterile air was continuously sparged into the medium.

After inoculation of the fermentor with the contents of the 2 Florence flasks, the agitator was turned on, sterile air was introduced at the rate of 2 c.f.m., and the temperature was controlled at 94° F. Glucamylase production and pH are shown in Table I as a function of time.

TABLE I

| Hours of Fermentaton | pH | Glucamylase, Units/ml |
|---|---|---|
| Set | 5.6 | |
| 18 | 4.4 | .3 |
| 46 | 3.2 | 2.4 |
| 73 | 3.0 | 4.3 |
| 90 | 2.9 | 5.3 |
| 114 | 2.9 | 6.7 |
| 144 | 2.8 | 7.9 |

NOTE.—Set solids=15.3%.

EXAMPLE 2

This experiment determines the effect of addition to the medium of the unique nutrient supplements referred to above. A fermentation was carried out in the same fermentor using the same culture (*A. niger* 3112), medium, inoculum, and fermentation conditions as in Example 1 except that grain stillage (dealcoholized beer from a previous grain alcohol fermentation) was used in place of the 40 gal. of tap water. The stillage solids supplied was about 3.5% of the total medium weight. The results of this glucamylase fermentation are shown in Table II.

TABLE II

| Hours of Fermentation | pH | Glucamylase, Units/ml |
|---|---|---|
| Set | 4.7 | |
| 17 | 4.5 | .2 |
| 41 | 3.7 | 1.9 |
| 67 | 3.4 | 4.3 |
| 91 | 3.2 | 6.3 |
| 112 | 3.2 | 7.7 |
| 136 | 3.0 | 9.3 |
| 160 | 3.0 | 12.0 |

NOTE.—Set solids=18.8%.

A comparison of Tables I and II markedly demonstrates that supplementation of the grain medium as used in Example 1 with grain stillage as used in Example 2 substantially increased the production of glucamylase by *A. niger* 3112. Similar improvement has been observed by using equal amounts (dry solids basis) of distillers' dried solubles in place of the described grain stillage.

EXAMPLE 3

This experiment is designed to demonstrate the efficacy of the Example 2 approach in connection with an alternate grain. A fermentation was carried out in the same fermentor using the same culture and fermentation conditions as in Example 1 except that 84.28 lb. of ground grain sorghum (milo), .42 lb. of ground barley malt, .86 lb. of ground lisuefying malt, 8 gal. of filtered grain stillage, and 32 gal. of tap water were used. Results of this glucamylase fermentation are shown in Table III.

TABLE III

| Hours of Fermentation | pH | Glucamylase, Units/ml |
|---|---|---|
| Set | 5.5 | |
| 25 | 3.8 | 1.15 |
| 46 | 3.5 | 2.5 |
| 69 | 3.3 | 3.7 |
| 93 | 3.2 | 4.9 |
| 117 | 3.1 | 5.8 |

Note.—Set solids=15.1%.

These results show that good yields of glucamylase can be produced by fermenting other cereal grains with *A. niger* 3112. In addition to the corn and sorghum referred to above, other grains such as rye, barley, and wheat may also be used to produce glucamylase with the organisms disclosed herein.

EXAMPLE 4

This experiment corresponds to Example 1 except that the culture *A. niger* 3122 is utilized instead of *A. niger* 3112. A fermentation was conducted in the same fermentor as used in the previous examples. The medium consisted of 100 lb. of ground corn, 0.5 lb. of ground barley malt (permalt), 1.0 lb. of liquefying malt, and 40 gal. of tap water. The medium was sterilized as described and inoculated, after cooling to 94° F., with 6 l. of culture of *A. niger* NRRL 3122. The fermentor was aerated and agitated as before, and glucamylase activity was periodically determined. Results are shown in Table IV.

TABLE IV

| Hours of Fermentation | pH | Glucamylase, Units/ml |
|---|---|---|
| Set | 5.8 | |
| 20 | 4.2 | .29 |
| 44 | 2.9 | 1.60 |
| 72 | 2.8 | 3.30 |
| 116 | 2.8 | 4.30 |
| 140 | 2.8 | 4.70 |

Note.—Set solids=14.3%.

EXAMPLE 5

Correspondingly to Example 2, this experiment varies the conditions of Example 4 by adding grain stillage to the growth medium. In this fermentation of the culture (*A. niger* 3122), inoculum, and fermentation conditions were the same as in Example 4, except that the medium was modified by replacing the 40 gal. of tap waterwith 40 gal. of grain stillage. The fermentor was aerated and agitated, and glucamylase activity was periodically determined. Results are shown in Table V.

TABLE V

| Hours of Fermentation | pH | Glucamylase, Units/ml |
|---|---|---|
| Set | 4.9 | |
| 27 | 4.2 | 0.7 |
| 44 | 3.3 | 1.7 |
| 67 | 2.9 | 3.5 |
| 91 | 2.9 | 4.5 |
| 115 | 2.9 | 6.0 |

Note.—Set solids=17.7%.

It is apparent from a comparison of the data in Tables IV and V that grain stillage substantially increases the production of glucamylase by *A. niger* NRRL 3122. The beneficial effect of grain stillage for both *A. niger* NRRL 3112 and NRRL 3122 is more strikingly shown in the rate and yield curves from Examples 1, 2, 4 and 5 as plotted in the drawing, although it should of course be understood that the advantages of the subject invention are still obtained when other grains are substituted for the corn of these examples and when distillers dried solubles are substituted (on a dry weight basis) for the grain stillage of these examples. Also, in accordance with the preferred practice of the invention, as suggested by the foregoing examples, set solids levels of 10 to 20% should be utilized in order to obtain high glucamylase yields under the fermentation conditions used, since levels below 10% generally result in lower yields of enzyme.

The examples which follow are concerned with the use of glucamylase ferments for the saccharification and fermentation of grain mashes. In the prior art and in commercial practice wherever fungal amylase ferments have been used, the normal level of addition has ranged from about 5,000–12,000 ml. of ferment per bushel of grain. However, in view of the greatly increased enzyme potency of ferments that can be obtained by practice of the invention disclosed herein, only about 250–500 ml. of glucamylase ferment is required per bushel of grain. Thus, the cost of aerobic fermentation equipment and materials is greatly reduced as compared to previous methods. Moreover, it has been found that even these relatively lower levels give maximum alcohol yields in shorter fermentation periods and with much lower levels of yeast inoculum than previously attained with any method of saccharifying and fermenting grain to alcohol. Finally, in this same context, even purified and semipurified fungal amylase products that are highly active in saccharifying starch are much less active for grain distillery usage than are glucamylase ferments utilized in accordance with the subject invention.

In the following examples, grain alcohol fermentations were carried out in 0.1 bushel scale in pilot plant equipment. Each cook contained a total of 2540 g. of ground grain and 7000 g. of tap water. The grain, exclusive of saccharifying malt, was cooked with agitation at 250° F. for 1 hour and cooled to 148° F. Saccharifying malt was added as indicated, and the mash was held at 148° F. for 30 minutes and was then cooled to 90° F. Grain stillage (3050 g.) was added, and glucamylase ferment and yeast inoculum were added as indicated. The total volume was then brought to 13,000 g. with water. Fermentation was caried out in a 90° F. water bath for 3–4 days during which time the progress of fermentation was followed by weighing the fermentors or by determining alcohol in a well-mixed sample of the fermenting mashes. Alcohol was determined by distilling an aliquot of the fermented mash and weighing the distillate in a pycnometer. The weight and composition of the residual feed was determined by removing the alcohol from the entire remaining ferment by introducing steam. The dealcoholized ferment was then screened to remove coarse grain solids, the screen effluent was concentrated by evaporation, mixed with the screened grains, and dried. The dried material was weighed, ground, and analyzed for nutrients. The nitrogen nutrients made available to the yeast by glucamylase ferment were measured against aspargin, the known, readily available nitrogen source. It was found that glucamylase ferments of the present invention, when used at the rate of about 500 ml. per bushel of grain, supplied from 20 to 30 mg. of yeast-available nitrogen per 100 ml. of mash, which provided excellent yeast growth and permitted a reduction in the size of yeast inoculum.

EXAMPLE 6

This experiment demonstrates the usefulness of the subject glucamylase ferment as a means for reducing the requirement of saccharifying malt and yeast inoculum in grain alcohol fermentations of corn and malt. The conditions of mashing and fermentation outlined in general above were modified so as to reduce the saccharifying malt from 8% to 1% and yeast inoculum from 3% to 1% as shown in Table VI.

TABLE VI

| Saccharifying Malt, Percent by Weight of grain | Glucamylase Ferment, ml. per 0.1 Bushel | Yeast Inoculum, Percent By Weight of Mash | Alcohol, Percent by Weight | | |
|---|---|---|---|---|---|
| | | | 24 Hr. | 48 Hr. | 72 Hr. |
| 2.5 | 0 | 3 | 4.30 | 5.90 | 6.30 |
| 1.0 | 50 | 1 | 5.53 | 6.63 | 6.74 |
| 8.0 | 0 | 3 | 5.40 | 6.46 | 6.52 |
| 8.0 | 50 | 3 | 6.36 | 6.72 | 6.71 |

These results show that even in the presence of 8% malt, glucamylase ferment increased the rate of fermentation to the extent that the fermentation is completed in 48 hours. Moreover, in the presence of glucamylase ferment and with only 1% malt and 1% yeast, the fermentation rate is greatly increased and the yield of alcohol is above that obtained with 8% malt. By using glucamylase ferment in accordance with the present invention, the yeast inoculum can be reduced to as low as a fraction of 1% by volume, and the saccharifying malt level can be reduced to 0.5% or even eliminated completely without significantly sacrificing fermentation rates or yields. Obviously, the use of low levels of barley malt and yeast inocula results in substantial savings in the production of grain alcohol.

EXAMPLE 7

While it is well known that microbial amylases rapidly saccharify starch and thus it might be expected that such enzymes in the form of concentrates could be used in the same manner as the described glycamylase ferment in grain distillery mashing, this experiment reveals that such enzyme concentrates are not as effective as glucamylase ferment and would be much more expensive in practice because of the larger amount of high cost enzyme required. This conclusion is demonstrated in Table VII, which summarizes the results obtained in a comparison of malt, glucamylase ferment produced in accordance with the present invention, and a commercial glucamylase preparation containing 160 u./g. The experiment was carried out as described above with only the saccharifying agents varied as shown in Table VII. All ferments received 3% by volume of yeast.

TABLE VII

| Saccharifying Agent | Alcohol, Percent by Weight | | | |
|---|---|---|---|---|
| | 24 Hr. | 48 Hr. | 72 Hr. | 96 Hr. |
| Malt, 2.5% by Weight of Grain | 4.57 | 6.15 | 6.53 | 6.57 |
| Malt, 1% by Weight of Grain and 50 ml Glucamylase Ferment per .1 Bu. (Total: 300 u. per .1 Bu.) | 5.47 | 6.78 | 6.78 | 6.83 |
| Malt, 1% by Weight of Grain and 5 g. Commercial Glucamylase per .1 Bu. (Total: 800 u. per .1 Bu.) | 4.86 | 6.52 | 6.79 | 6.84 |
| Malt, 1% by Weight of Grain and 10 g. Commercial Glucamylase per 1 Bu. (Total: 1,600 u. per .1 Bu.) | 4.90 | 6.62 | 6.84 | 6.88 |

It is apparent from these results that glucamylase ferment is more active in grain alcohol fermentation than the commercial semipurified glucamylase product despite the higher amounts of starch-hydrolyzing enzyme supplied (and higher cost) of the commercial product. The data in Table VII further show that alcohol formation is more rapid with the subject glucamylase ferment containing 300 u. per bushel than with 800 and 1600 u. per bushel in the form of commercial semipurified glucamylase.

Of course, the quality of alcohol produced by modifying any distillery process is always of prime importance. To evaluate the quality of alcohol produced by using glucamylase ferment, organoleptic, chemical, and gas chromatographic methods of analyses were used. These methods were applied to products produced from laboratory, pilot plant, and plant-scale trials. In all cases, the alcohol produced with glucamylase ferment was of excellent quality, comparable chemically and organoleptically to alcohol produced in the conventional manner with barley malt as the saccharifying agent.

The composition of distillers' feed products is also an important consideration in the modification of distillery processes. Because of the near-complete fermentation of the carbohydrates of grain by malt in combination with glucamylase ferment, somewhat higher noncarbohydrate nutrient values would be expected. This expectation is confirmed by the following analytical values for distillers dried grains with solubles produced by a conventional saccharifying method (malt only) and produced by a combination of malt and glucamylase ferment in accordance with the subject invention.

EXAMPLE 8.—ANALYSIS OF DISTILLERS DRIED GRAINS WITH SOLUBLES

| | From Malt Saccharification | From Malt and Glucamylase Ferment Saccharification |
|---|---|---|
| Yield of Feed in Lb. per Bushel (Dry Basis) | 20.5 | 18.0 |
| Protein, Percent (Dry Basis) | 26.7 | 28.3 |

With the increase in protein content as shown above, corresponding increases in fat, mineral, and vitamin contents have been observed. Thus, the feed products from the use of the described glucamylase ferment are somewhat richer in important nutrients than are feed products made from conventional methods of grain fermentation.

The examples given are merely illustrative of the invention disclosed herein. It will be obvious to those skilled in the art that the processes referred to above can be modified in various ways without greatly altering the utility thereof, as for example by the use of different fermentation media, culture propagation methods, and fermentation equipment than those specifically described. It should be further understood that various changes, modifications, and alterations can be effected in the details of composition, formulation, and processing of the materials referred to above, without departing from the spirit and the scope of the present invention, as defined in the appended claims.

What is claimed is:

1. A process of producing an enzyme system characterized by high glucamylase potency comprising the cultivation under submerged aerobic conditions of a strain selected from the group consisting of *Aspergillus niger* strains NRRL 3112 and 3122 in a cereal grain medium of high concentration supplemented by a nutrient selected from the group consisting of grain stillage and distillers' dried solubles.

2. A process as claimed in claim 1 wherein the grain concentration is within the range of about 12 to about 20 g. grain per 100 ml. of medium and the nutrient supplement on a dry substance basis is within the range of about 1 to about 10 percent based on the total weight of the final medium.

3. A process as claimed in claim 1 wherein the selected nutrient supplement is grain stillage comprising the dealcoholized liquid-grain residue from a previous fermentation of grain with yeast in the production of an alcohol product.

4. A process as claimed in claim 1 wherein the supplemented medium is sterilized, cooled, and inoculated with the selected strain, and is then incubated at such temperature as will support the growth of such strain while agitating the medium and aerating it with a stream of sterile air.

5. A process as claimed in claim 4 wherein the incubation temperature is between about 85 and about 98° F.

6. A process as claimed in claim 4 wherein the cereal grain medium contains from about 12 to about 20 g. grain per 100 ml. medium, is adjusted before sterilization to a pH of about 3.0 to about 7.0, the aeration air flow rate is about 0.25 to about 1.5 volumes of air per volume of medium per minute, agitation is provided by a power input of from about 0.5 to about 2.5 horsepower per 100 gallons of medium, and the medium is vigorousy aerated and agitated for a period of about 3 to about 7 days.

7. A process as claimed in claim 1 wherein said medium comprises from about 10 to 20% grain cereal and from about 3 to 6% nutrient supplement.

8. A process as claimed in claim 1 in which said medium comprises a cereal grain selected from the group consisting of corn, grain sorghum, barley, wheat, rye, and mixtures thereof.

9. A process of conducting saccharification and fermentation of a starch product to an alcohol product comprising the addition to the starch product of a glucamylase ferment characterized by high glucamylase and proteinase potency and prepared by the cultivation under submerged aerobic conditions of a strain selected from the group consisting of *Aspergillus niger* strains NRRL 3112 and 3122 in a cereal grain medium of high concentration supplemented by a nutrient selected from the group consisting of grain stillage and distillers' dried solubles.

10. A process as claimed in claim 9 wherein said medium comprises from about 10 to 20% grain cereal and from about 3 to 6% nutrient supplement.

11. A process as claimed in claim 9 in which said starch product comprises a cereal grain and said alcohol product comprises grain alcohol and in which said medium comprises a cereal grain selected from the group consisting of corn, grain sorghum, barley, wheat, rye, and mixtures thereof.

12. A process as claimed in claim 9 wherein the selected nutrient supplement is grain stillage comprising the dealcoholized liquid-grain residue from a previous fermentation of grain with yeast in the production of an alcohol product.

13. A process as claimed in claim 9 wherein the glucamylase ferment is used at the rate of about 250 to about 500 ml. per bushel of grain.

14. A process of conducting saccharification and fermentation of a starch product to an alcohol product comprising the addition to the starch product of a glucamylase ferment characterized by high glucamylase and proteinase potency and prepared by the cultivation under submerged aerobic conditions of a strain selected from the group consisting of *Aspergilus niger* strains NRRL 3112 and 3122 in a growth medium having initial solids content within the range of about 10 to about 20 percent of the medium and supplemented by a nutrient selected from the group consisting of grain stillage and distillers' dried solubles.

References Cited
UNITED STATES PATENTS

| | | | |
|---|---|---|---|
| 2,356,218 | 8/1944 | Christensen | 195—17 X |
| 2,641,568 | 6/1953 | Beesh | 195—114 X |
| 3,081,172 | 3/1963 | Dennis et al. | 195—17 X |
| 3,301,768 | 1/1967 | Smiley | 195—66 |

LIONEL M. SHAPIRO, *Primary Examiner.*

U.S. Cl. X.R.

195—66; 99—31